(12) United States Patent
Shim

(10) Patent No.: US 8,442,523 B2
(45) Date of Patent: May 14, 2013

(54) LOCATION POSITIONING METHOD IN HANDOVER BETWEEN NETWORKS

(75) Inventor: Dong-Hi Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/538,766

(22) Filed: Jun. 29, 2012

(65) Prior Publication Data

US 2012/0270542 A1    Oct. 25, 2012

Related U.S. Application Data

(63) Continuation of application No. 11/967,903, filed on Dec. 31, 2007, now Pat. No. 8,229,420, which is a continuation of application No. 11/727,132, filed on Mar. 23, 2007, now Pat. No. 8,019,355.

(60) Provisional application No. 60/785,280, filed on Mar. 24, 2006, provisional application No. 60/872,508, filed on Dec. 4, 2006.

(30) Foreign Application Priority Data

Feb. 21, 2007 (KR) .......................... 10-2007-0017598

(51) Int. Cl.
*H04W 4/00* (2009.01)

(52) U.S. Cl.
USPC .................. 455/432.1; 455/456.1; 455/435.1; 455/436; 455/552.1; 370/331

(58) Field of Classification Search .......... 455/436–444, 455/432.1–432.3, 552.1, 456.1–456.7
See application file for complete search history.

(56) References Cited

U.S. PATENT DOCUMENTS

| 7,706,813 B2 | 4/2010 | Shim |
| 2004/0142702 A1 | 7/2004 | Hefner et al. |
| 2007/0182547 A1 | 8/2007 | Wachter et al. |

FOREIGN PATENT DOCUMENTS

| CN | 1671235 A | 9/2005 |
| CN | 1738474 A | 2/2006 |
| EP | 1 372 346 B1 | 8/2005 |

(Continued)

OTHER PUBLICATIONS

OMA-LOC-2006-0311-CR_ULP_TS_2_0_VSLP_Handover_NI_NonProxy.doc (Mar. 11, 2006).*

(Continued)

*Primary Examiner* — Vladimir Magloire
(74) *Attorney, Agent, or Firm* — Birch, Stewart, Kolasch & Birch, LLP

(57) ABSTRACT

A method according to one embodiment includes: transmitting, by a mobile terminal, a secure user plane location (SUPL) position initiation message to a home-SUPL location platform (H-SLP); receiving, by the mobile terminal, a SUPL end message from the H-SLP, the SUPL end message including a parameter indicating that the mobile terminal is outside of a coverage of a visited-SUPL location platform (V-SLP); transmitting, by the mobile terminal, a SUPL triggered start message to the H-SLP, the SUPL triggered start message including a cause for re-sending the SUPL triggered start message; and receiving, by the mobile terminal, a SUPL triggered response message from the H-SLP, the SUPL triggered response message including at least one trigger parameter.

16 Claims, 4 Drawing Sheets

FOREIGN PATENT DOCUMENTS

| | | |
|---|---|---|
| EP | 1 589 350 A1 | 10/2005 |
| RU | 2004-139106 C2 | 6/2003 |
| WO | WO 2005/057884 A2 | 6/2005 |
| WO | WO 2005/069671 A1 | 8/2005 |

OTHER PUBLICATIONS

Ake Busin, Ericsson Andreas Wachter, Qualcomm, Awachter@qualcomm.com Donghee Shim, LG Electronics, Inc., "CR ULP TS 2.0 V-SLP Handover Network Initiated Non-Proxy," Open Mobile Alliance, [Online] Oct. 9, 2003, XP005539369, Retrieved from the Internet: URL:http//member.openmobilealliance.org/ftp/public_documents/loc/2006/OMA-LOC-2006-0311-CR_ULP_TS_2_0_VSLP_Handover_NI_NonProxy.zip>.

Ake Busin, Ericsson: "CR SUPL TS 2.0 Network Change Generalized," OMA, [Online] Mar. 23, 2006, XP002532625, Internet Publication, Retrieved from the Internet:URL:http://member.openmobilealliance.org/ftp/public_documents/loc/2006/OMA-LOC-2006-0209-CR_SUPL_TS_2_0_NetWorkChangeGeneralized.zip> [retrieved on Mar. 16, 2009].

OMA (Open Mobile Alliance), Candidate Verson 1.0, Nov. 21, 2005, pp. 26-48.

Open Mobile Alliance Ltd: "Secure User Plane Location Architecture, Draft Version 2.0—Mar. 7, 2006, OMA-AD-SUPL-V2 0-20060307-D," Internet Citation, [Online], XP002465820, Retrieved from the Internet URL:http://member.openmobilealliance.org/ftp/public_documents/loc/Permanent_documents/> [retrieved on Jan. 15, 2008], Chapter 5.3.1.4.

* cited by examiner

LOCATION POSITIONING METHOD IN HANDOVER BETWEEN NETWORKS

This present application is a continuation of U.S. patent application Ser. No. 11/967,903, filed Dec. 31, 2007, now U.S. Pat. No. 8,229,420 which in turn is a continuation of U.S. patent application Ser. No. 11/727,132 filed on Mar. 23, 2007 (now U.S. Pat. No. 8,019,355, issued Sep. 13, 2011), which claims priority under 35 U.S.C. §119(e) on U.S. Provisional Application Nos. 60/785,280 and 60/872,508 filed on Mar. 24, 2006 and Dec. 4, 2006, respectively, and also claims priority under 35 U.S.C. §119(a) on Korean Patent Application No. 10-2007-0017598 filed on Feb. 21, 2007. The entire contents of all these U.S. non-provisional applications are incorporated by reference.

BACKGROUND OF THE INVENTION

1. Field of the Invention

The present invention relates to a location information system based upon a Secure User Plane Location (SUPL) architecture, and more particularly, to a triggered location positioning method based on an area event in handover between networks.

2. Description of the Related Art

A mobile communication system provides a location service for supplying a location of a terminal to a certain entity periodically or in response to a request, by including a relevant functional part for calculating the location of the terminal in a mobile communication network.

The location service-related network structure varies according to the internal network structure such as 3GPP or 3GPP2. Methods for calculating a current location of a terminal include a cell-ID method for transferring an ID of a cell to which the terminal belongs, a method for measuring the time taken for radio waves of the terminal to reach each base station and calculating the location of the terminal by using trigonometric measurement, and a method using the Global Positioning System (GPS).

In order to provide the location service to a user, considerable signaling and location information should be transferred between the terminal and a location server. The so-called 'positioning technologies' that have been standardized for providing such location services, for instance, a location service based upon the location of a mobile terminal, are undergoing rapid widespread dissemination. The positioning technologies can be provided through a user plane and a control plane. A Secure User Plane Location (SUPL) protocol, which is well-known as an example of the positioning technologies, provides the location service through the user plane.

The SUPL protocol is an efficient method for transferring the location information required for the location calculation of a mobile station. The SUPL protocol employs a user plane data bearer so as to transfer positioning assistance information such as GPS assistance, and to carry positioning technology associated protocols between the mobile terminal and a network.

In general, a SUPL network for providing the location service in a location information system includes an SUPL agent, SUPL Location Platform (SLP), and SUPL Enabled Terminal (SET). The SUPL agent refers to a logical service access point using location information which is actually measured. The SLP refers to a SUPL service access point at a network portion where network resources are accessed to obtain the location information. The SET, being a device capable of communicating with the SUPL network using a SUPL interface, may be one of a User Equipment (UE) for UMTS, a Mobile Station (MS) for GSM, an IS-95 MS, a laptop computer having a SET function, a Personal Digital Assistant (PDA) or the like. The SET can be various mobile terminals which are connected through a Wideband LAN (WLAN). The SET supports various procedures defined by the SUPL protocol by being connected to the network through the user plane bearer.

In a mobile communication system such as the location information system, a network for which a user has initially registered is called a home network, and when the user moves or roams to another area, other than the home network area, the network of that other area is called a visited network. An SLP in the home network is called an H-SLP while an SLP in the visited network is called a V-SLP. When a SUPL procedure starts in the network, an SLP to which an external client is first connected is called an R-SLP (requesting SLP). The R-SLP is a logical entity, which can be the same as the H-SLP or not. An SET aimed to track its current location is defined by a target SET.

The SLP, as a location server in the network, may include an SUPL Positioning Center (SPC) which is an entity for calculating an actual location and an SUPL Location Center (SLC) for managing other functions of the SLP excluding the function for calculating location information, for instance, roaming, resource managing, and the like. Therefore, the SET can calculate the location information by communicating with the SPC via the SLC (Proxy mode), or calculate the location information by opening a direct connection with the SPC (Non-proxy mode).

However, the triggered location service based upon the related art SUPL architecture cannot properly process an area event when an initially registered network is changed.

SUMMARY OF THE INVENTION

Therefore, an object of the present invention is to provide a location positioning method for efficiently performing an area event even when a registered network is changed in a triggered location service based upon a Secure User Plane Location (SUPL) architecture.

To achieve these and other advantages and in accordance with the purpose of the present invention, as embodied and broadly described herein, there is provided a location positioning method in handover between networks, in which a terminal performs a triggered positioning (location positioning) with a serving network through a home network in response to a positioning request of an external agent, the method comprising: requesting, by the terminal, new event trigger parameters to the home network through a first message while an area event session is ongoing; determining, by the home network, the serving network of the terminal by using location identifier included in the first message; receiving, by the home network, area identifier of a target area for which the positioning is requested from the determined serving network; and transmitting, by the home network, new event trigger parameters including the area identifier to the terminal through a second message.

Preferably, the new event trigger parameters are requested when a network is changed or when a terminal is outside of the coverage area of a serving network.

Preferably, the network change indicates the change of a service provider or a communication network.

Preferably, the network change refers to changes of an MCC (Mobile Country Code) or an MNC (Mobile Network Code) for GSM/WCDMA, and an MCC, a Network ID (NID) or a System ID (SID) for CDMA.

Preferably, a terminal recognizes the network change so as to inform a network, and a serving network determines whether the terminal is within coverage area of a serving network or not so as to inform the terminal.

Preferably, the first message is a session triggered start message, and the second message is a session triggered response message.

Preferably, the session triggered start message contains at least session-id, SET capabilities, location identifier (lid), and cause for re-sending the session start message.

Preferably, the home network is an H-SLP, and the serving network is a V-SLP. The V-SLP is a location server of a network to which SET belongs.

Preferably, the location identifier is location id (lid).

Preferably, the area identifier of the target area is cell-id.

Preferably, the new event trigger parameters contain target area, event type, cell-id of the target area, and positioning period.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

The present invention is typically implemented in the SUPL network. However, the present invention may be applied to a wireless communications system operated according to a different specification. Reference will now be made in detail to the preferred embodiments of the present invention, examples of which are illustrated in the accompanying drawings.

The present invention is based on a method for providing a triggered location positioning service by using an area event. That is, in the present invention, a network converts area information for which a positioning is requested into cell-id information so as to transmit to a terminal. While moving, the terminal periodically compares a cell-id to which the terminal itself currently belongs with cell-ids being forwarded in advance, determines whether it is close to the area where the positioning is requested, and periodically checks its location to inform the network about an area event occurrence when it reaches to the area where the positioning is requested.

In general, when roaming is performed from an initially registered network to a new network, cell-id of the corresponding network is different from that of the initially registered network. In the present invention, roaming is determined by a terminal or a network, so that the terminal may request an area identifier (e.g. cell-id) indicating a previously requested area to a new network, and then the new network forwards a new cell-id indicating the requested area to the terminal. Then, the terminal, as aforementioned, performs a periodic positioning by comparing cell-ids.

Figure 1:
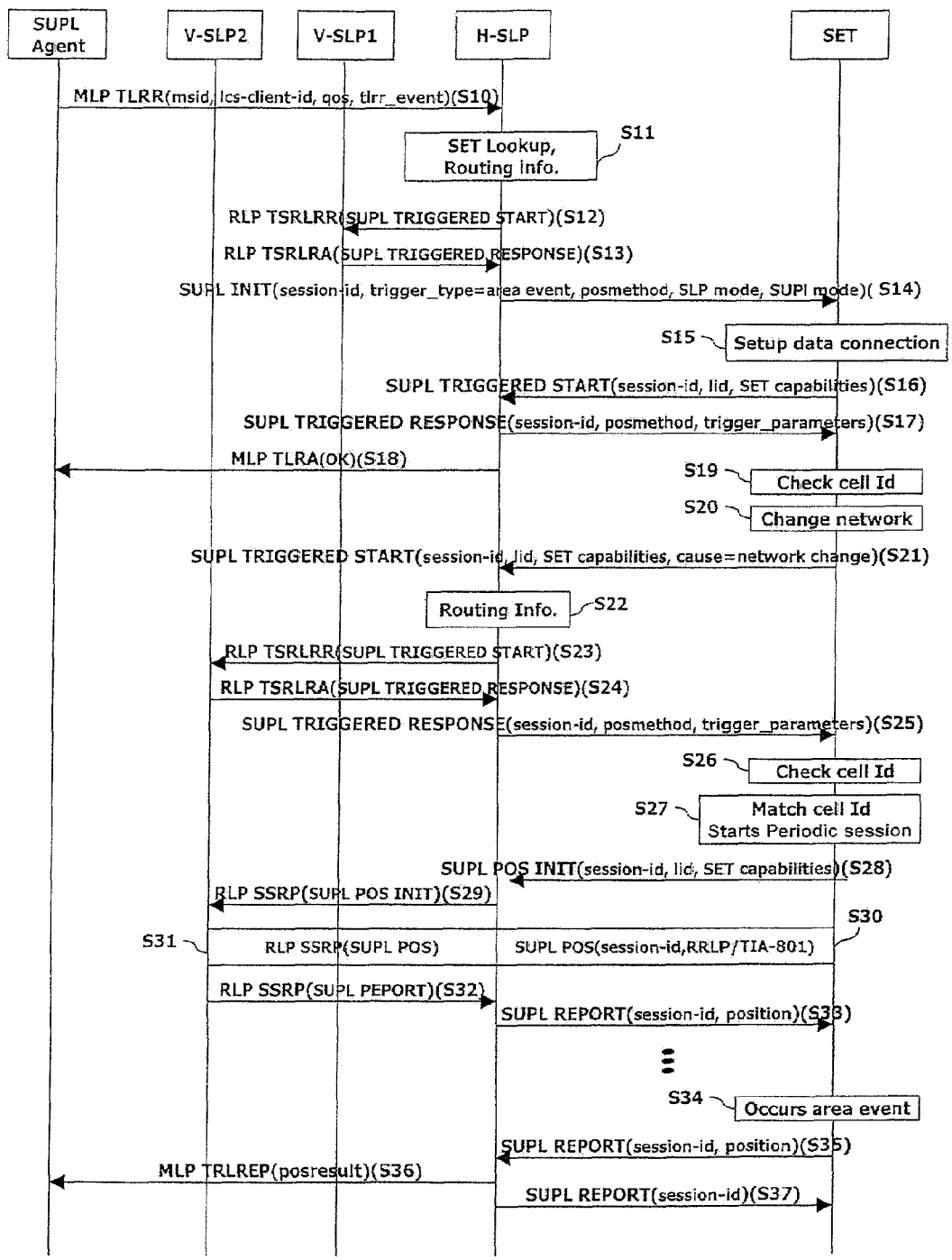
FIG. 1 illustrates an SET initiated Proxy mode, as a first embodiment of the location positioning method in handover between networks according to the present invention.

FIG. 1 illustrates a network initiated proxy mode, as an embodiment of the location positioning method for handovers between networks according to the present invention. In particular, FIG. 1 shows that a terminal informs a network that a newly registered network after roaming has been changed.

As shown in FIG. 1, when an area-related positioning is requested from an external LCS client, an SUPL agent requests the area-related positioning to an H-SLP, as a location server of a home network, through an MLP (Mobile Location Protocol) TLRR (Triggered Location Reporting Request) message (S10).

The MLP TLRR message contains parameters such as ms-id, client-id, QoP, tlrr_event, and the like. The ms-id indicates a positioning target (SET), and the QoP indicates accuracy (a time delay and spatial accuracy) in a positioning. The tlrr_event indicates area event information such as a type of an area-related positioning (going into a target area, coming out of the target area or within the target area, etc.) and a target area (a name of a certain area or its accurate position).

The MLP TLRR message may further contain parameters related to types of the positioning values (indicating whether it is a current value or a value that is most recently traced when it is difficult to trace its current value, and so on) and parameters for setting priorities to each positioning request for a plurality of positioning requests.

When the MLP TLRR message is received, H-SLP checks whether a target SET (hereinafter, referred to as "SET") supports an SUPL using a lookup table, and checks whether SET is currently SUPL roaming using routing information (S11). In addition, H-SLP checks user privacy information of the target SET which is related to the corresponding positioning.

According to the checked result, when SET supports the SUPL and is currently roaming, H-SLP forwards a session triggered start message (SUPL TRIGGERED START message) to V-SLP1, as a location server of an area to which SET currently belongs, through an RLP TSRLRR message (S12). The SUPL TRIGGERED START message contains area event information received in the MLP TLRR message. Herein, H-SLP refers to a home network of SET, and V-SLP refers to a serving network of SET.

In response to the SUPL TRIGGERED START message, V-SLP1 transfers a session triggered response message (SUPL TRIGGERED RESPONSE message) to H-SLP through an RLP TSRLRA message (S13). Herein, V-SLP1 recognizes area information received from H-SLP, and forwards cell information of the visited network indicating the target area to H-SLP. This allows cell-ids indicating the requested area in the network to which the terminal currently belongs to be forwarded from V-SLP1, since area information for which the SUPL agent initially requested is generally not specific cell information, but information about administrative districts such as "Seoul" or "Shingil 1-dong," or specific location information including latitude, longitude, or coordinates (x, y, z). In addition, V-SLP1 specifies a desired positioning method (posmethod), and forwards the desired posmethod to H-SLP.

Upon receiving the SUPL TRIGGERED RESPONSE message, H-SLP starts an SUPL procedure with SET by transmitting a session initialization message (SUPL INIT message) to SET (S14). The SUPL INIT message may contain at least session-id, trigger_type (periodic or area event), SLP mode (proxy or non-proxy mode), positioning method (posmethod) to be used, SUPL mode (immediate or triggered), and the like. The SUPL INIT message may contain a notification parameter if the user requires a notification related to location information after confirming a privacy of SET.

Further, area event trigger parameters (hereinafter, referred to as "trigger parameters") may be included in the SUPL INIT message. Preferably, the trigger parameters include target area, event type, cell-id(s), and positioning period. However, when a Short Message Service (SMS) is used, the trigger parameters may not be forwarded through the SUPL INIT message due to a limited size of the SMS.

When the SUPL INIT message is received, in case a data connection is currently not established to any network, SET requests a data connection to a packet data network (e.g. 3GPP or 3GPP2) (S15).

If the data connection is established, SET transmits a SUPL TRIGGERED START message including session-id, lid and SET capability to H-SLP (S16). When the trigger parameters are not forwarded in the previous step (S14), H-SLP forwards the area event trigger parameters (hereinafter, referred to as "trigger parameters") to SET through a SUPL TRIGGERED RESPONSE message (S17). In addition, H-SLP transmits acknowledgement for granting the positioning request to the SUPL agent through the MLP TLRA message.

Accordingly, SET periodically compares cell-ids indicating the requested area (target area) with cell-ids to which SET itself currently belongs (S19), and then checks whether SET itself moved near to the area requested by the SUPL agent.

In general, when a service provider or a network is changed, a cell construction (size of the cell and its number) may be changed between service providers or between networks. Accordingly, the cell-ids indicating the requested area are changed.

Therefore, when SET moves from a network where it has initially received the SUPL INIT message and then registers for a new network, or when lid (location id) stored in SET is changed, SET acknowledges that the network is changed, and retransmits the SUPL TRIGGERED START message including "cause" and lid of the current network to H-SLP (S21). The SUPL TRIGGERED START message contains at least session-id, SET capabilities, lid, cause for re-sending the SUPL TRIGGERED START message, for instance, network change.

Preferably, the network change indicates in case a change is detected in lid stored in SET, an MCC (Mobile Country Code) or an MNC (Mobile Network Code) for GSM/WCDMA, and an MCC, a NID (Network ID) or a SID (System ID) for CDMA. In addition, the location id includes Cell Info and Status, and the Cell Info is further divided into GSM Cell Info, WCDMA Cell Info, and CDMA Cell Info.

When the SUPL TRIGGERED START message is received, H-SLP finds a V-SLP2 which belongs to a new network using routing information such as lid transmitted from SET, and transmits the SUPL TRIGGERED START message to V-SLP2 through the RLP message (S23). Herein, the SUPL TRIGGERED START message includes area event information.

V-SLP2 examines the received area event, recognizes cell-ids of the network indicating the target area, and then forwards the SUPL TRIGGERED RESPONSE message including the recognized cell-ids through the RLP (S24). Herein, posmethod which V-SLP2 desires to use may also be designated.

H-SLP transmits (downloads) a trigger parameter including new cell-ids to SET through the SUPL TRIGGERED RESPONSE message (S25).

Accordingly, SET periodically compares the new cell-ids included in the SUPL TRIGGERED RESPONSE message with cell-ids to which SET itself currently belongs, and checks whether SET is close to the requested area (S26). According to the checked result, when one of the newly transmitted cell-ids corresponds to cell-id to which SET currently belongs, that is, when SET itself is close to the requested area, SET transmits a session positioning initialization message (SUPL POS INIT message) to H-SLP and starts a periodic positioning procedure (S27, S28). Herein, the positioning period may be forwarded from H-SLP to SET by being included in the SUPL INIT message or SUPL TRIGGERED REQUEST message in advance, or the terminal may determine the corresponding period in the SUPL POS INIT message and forward it to H-SLP.

H-SLP forwards the SUPL POS INIT message through the RLP message to V-SLP2 (S29). SET and H-SLP calculate a location of SET by consecutively exchanging messages for the actual positioning and by performing the SUPL POS procedure (S30). Herein, since H-SLP forwards the message transmitted from SET in a proxy type and the message transmitted from V-SLP2 to V-SLP2 and SET, the actual positioning calculation is performed by V-SLP2 or SET (SET-assisted mode or SET-based mode) (S31).

If the positioning calculation is performed in an SET-assisted mode, V-SLP2 transmits the SUPL TRIGGERED START message including the calculated position to H-SLP through the RLP message (S32), and H-SLP forwards the position to SET through a session report message (SUPL REPORT message) (S33). However, when the positioning calculation is performed in an SET-based mode, a message for transmitting the calculated position is not required.

Thereafter, SET repeats operations of the previous steps (S28) through (S33) at each positioning period. At each positioning period, SET compares the calculated position with an actual position set by area event information, and then checks whether an area event occurs. According to the checked result, if the two positions are different from each other and an area event does not occur, SET performs operations of the previous steps (S28) through (S33) to calculate a new position. If the two positions are the same and an area event occurs (S34), the corresponding position is transmitted to H-SLP through the SUPL REPORT message (S35).

Accordingly, H-SLP transmits the posresult received from SET to the SUPL agent using a MLP TLREP message (S36), and ends the SUPL session by transmitting a session end message (SUPL END message) to SET (S37).

Figure 2:
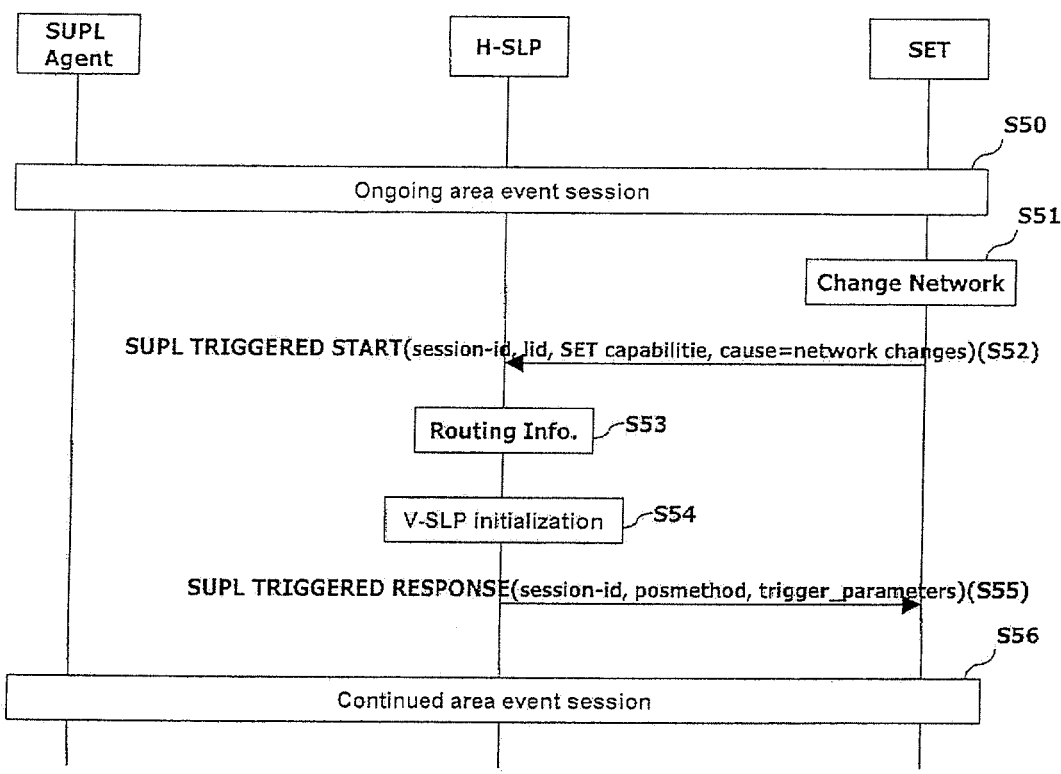
FIG. 2 schematically illustrates the location positioning method in handover between networks shown in FIG. 1 according to the present invention.

FIG. 2 schematically illustrates the location positioning method in handover between networks shown in FIG. 1 according to the present invention.

As shown in FIG. 2, while an area event session is ongoing, SET checks whether a network is changed or not (S50, S51). In this case, the area event session includes all positioning procedures between V-SLP (V-SLP1 or V-SLP2), H-SLP, and SET in FIG. 1. The network refers to a serving network, i.e. a location server.

According to the checked result, if the network is changed, SET transmits a SUPL TRIGGERED START message to H-SLP to request a new trigger parameter (S52). Preferably, the SUPL TRIGGERED START message contains at least session-id, SET capabilities, location identifier (lid), cause for re-sending the SUPL TRIGGERED START message (i.e. network change) and the like. The SET capabilities include the supported positioning methods (e.g. SET-assisted A-GPS, SET-based A-GPS) and associated positioning protocols (e.g. RRLP, RRC, TIA-801).

H-SLP finds another V-SLP which belongs to a new network based on the lid included in the SUPL TRIGGERED START message, and then performs an initialization operation of the corresponding V-SLP (S53, S54). The initialization of V-SLP indicates the steps (S23, S24) in FIG. 1, and corresponds to an operation in which H-SLP informs the corresponding V-SLP about the network change and receives new cell-id(s).

When new cell-ids are received from V-SLP, H-SLP transmits the SUPL TRIGGERED RESPONSE message including session-id, posmethod, trigger-parameters to SET. Preferably, the area event trigger-parameters include a new cell-id of the target area.

Therefore, SET and V-SLP continue to perform the same area event session as the steps (S26~S42) in FIG. 1 using information included in the SUPL TRIGGERED RESPONSE message.

In short, if a network is changed while an area event session is ongoing, SET requests a new trigger parameter to H-SLP. And, H-SLP informs the corresponding V-SLP about the network change, receives a new cell-id, and then transmits (downloads) the received cell-id to SET. Accordingly, SET performs a requested area event positioning operation using the received (downloaded) new cell-id.

As shown in the steps (S27, S28) in FIG. 1, when cell-id indicating area-id is used in an area event trigger service to detect an area event, and if the current cell-id and one or more cell-ids of the downloaded cell-ids are same, SET finally transmits the SUPL POS INIT message to H-SLP.

Therefore, if SET does not periodically transmit the SUPL POS INIT message to detect an area event, V-SLP cannot receive current lid included in the SUPL POS NIT message from SET. Accordingly, the network cannot detect a change of V-SLP.

As a result, if the cell-id is used to detect an area event or to help to detect an area event (before pursuing the detailed positioning with SUPL POS session), SET should send the SUPL POS INIT message in certain cases, e. g. the change of MNC (e.g. GSM or UMTS) or SID (e.g. CDMA) to make sure the change of V-SLP. When the SUPL POS INIT message is received, V-SLP compares lid included in the SUPL POS INIT message with coverage area of the V-SLP itself, and checks whether SET is within its coverage area or not. If the checked result shows that SET is outside of its coverage area (in handover), V-SLP informs SET of this, and SET then requests a new trigger parameter to H-SLP. Accordingly, as explained in FIGS. 1 and 2, H-SLP selects and initializes a new V-SLP, and then transmits the new trigger parameter to SET.

As so far described, handover between V-SLPs may be performed in a network-initiated proxy mode, or in an SET-initiated proxy mode as shown in FIGS. 1 and 2.

Figure 3:
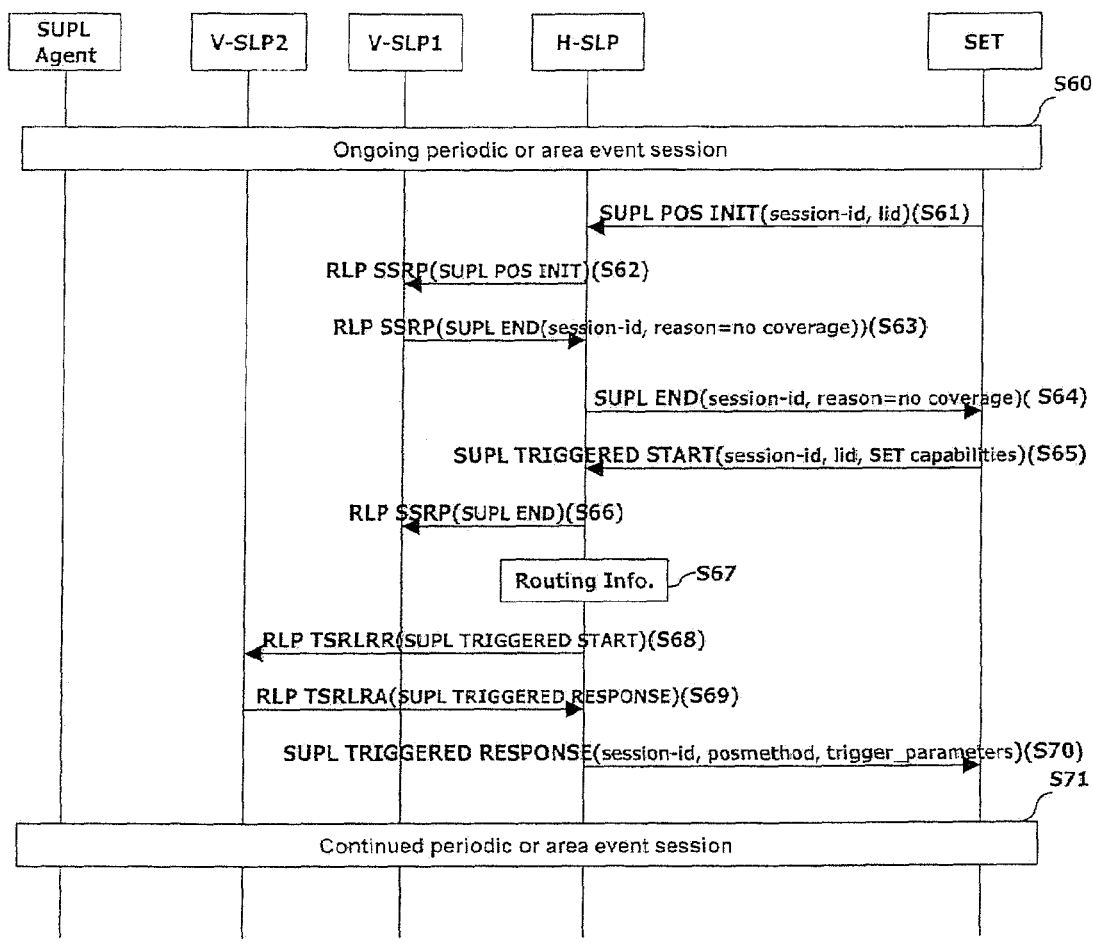
FIG. 3 illustrates a Network initiated Proxy mode, as a second embodiment of the location positioning method in handover between networks according to the present invention.

FIG. 3 illustrates a Network initiated Proxy mode, as a second embodiment of the location positioning method in handover between networks according to the present invention. In particular, FIG. 3 shows the case that V-SLP determines whether a terminal is within coverage area of a serving network or not, and then informs the terminal about the determined result.

As described in FIG. 3, while a trigger session such as a periodic or an area event session is ongoing, SET transmits a SUPL POS INIT message to H-SLP so as to start a positioning session with V-SLP (S60). Preferably, in case area-id (e.g. cell-id) is used to detect an area event, SET sends the SUPL POS INIT message to H-SLP when an MNC or an SID is changed.

Upon receiving the SUPL POS INIT message, H-SLP forwards the SUPL POS INIT message to a V-SLP1 using an RLP message (S62). V-SLP1 compares lid included in the SUPL POS INIT message with coverage area of V-SLP1 itself, and then checks whether SET is within its coverage area or not. If the checked result shows that SET is within its coverage area, V-SLP1 proceeds to the step (S73), which will be explained later, and then continues to perform a periodic or an area event session. If not, V-SLP1 transmits a SUPL END message including the checked result (no coverage) to H-SLP using the RLP message (S63).

H-SLP transmits the SUPL END message to SET (S64). And SET acknowledges a handover occurrence between V-SLPs based on the reason included in the SUPL END message, and transmits a SUPL TRIGGERED START message to H-SLP to request a new trigger parameter (S65). Preferably, the SUPL TRIGGERED START message contains at least session-id, SET capabilities, lid, cause for re-sending the SUPL TRIGGERED START message (cause=no coverage), and the like. The SET capabilities include the supported positioning methods (e.g. SET-Assisted A-GPS, SET-Based A-GPS) and associated positioning protocols (e.g. RRLP, RRC, TIA-801).

H-SLP informs V-SLP1 about the end of the trigger session by sending the SUPL END message using the RLP message to V-SLP1 (S66).

In addition, H-SLP confirms that SET is currently SUPL roaming and is outside of the coverage area of V-SLP1 on the basis of routing information, and determines a V-SLP2 based on the lid included in the SUPL TRIGGERED START message (S67).

Once V-SLP2 is determined, H-SLP transmits the SUPL TRIGGERED START message to V-SLP2 through the RLP message to inform that SET will start a SUPL positioning procedure (S68). Herein, the SUPL TRIGGERED START message includes area event information.

V-SLP2 transmits a SUPL TRIGGERED RESPONSE message to H-SLP to inform that it is ready to initiate a SUPL positioning procedure (S69). In this case, V-SLP2 examines the received area event, recognizes cell-ids of the network indicating the target area, and then forwards the SUPL TRIGGERED RESPONSE message including the recognized cell-ids to H-SLP through the RLP.

H-SLP transmits the received SUPL TRIGGERED RESPONSE message to SET (S70). The SUPL TRIGGERED RESPONSE message contains session-id, posmethod, and trigger parameter. Preferably, the trigger parameter, as shown in FIG. 1, includes target area, event type, cell-id of the target area, and positioning period.

Accordingly, SET and V-SLP2 continue to perform the periodic event session or the same area event session as the steps (S26~S42) in FIG. 1 by using information included in the SUPL TRIGGERED RESPONSE message (S71).

In general, the location service provided by a SUPL-based location information system is divided into a network-initiated service and a SET-initiated service. Further, the location service is divided into a proxy mode and a non-proxy mode. In the proxy mode, SET exchanges messages directly with H-SLP of the home network to perform a positioning procedure. In the non-proxy mode, SET exchanges messages with an SLC (SUPL Location Center) and an SPC (SUPL Positioning Center) in H-SLP to perform a positioning procedure.

Figure 4:
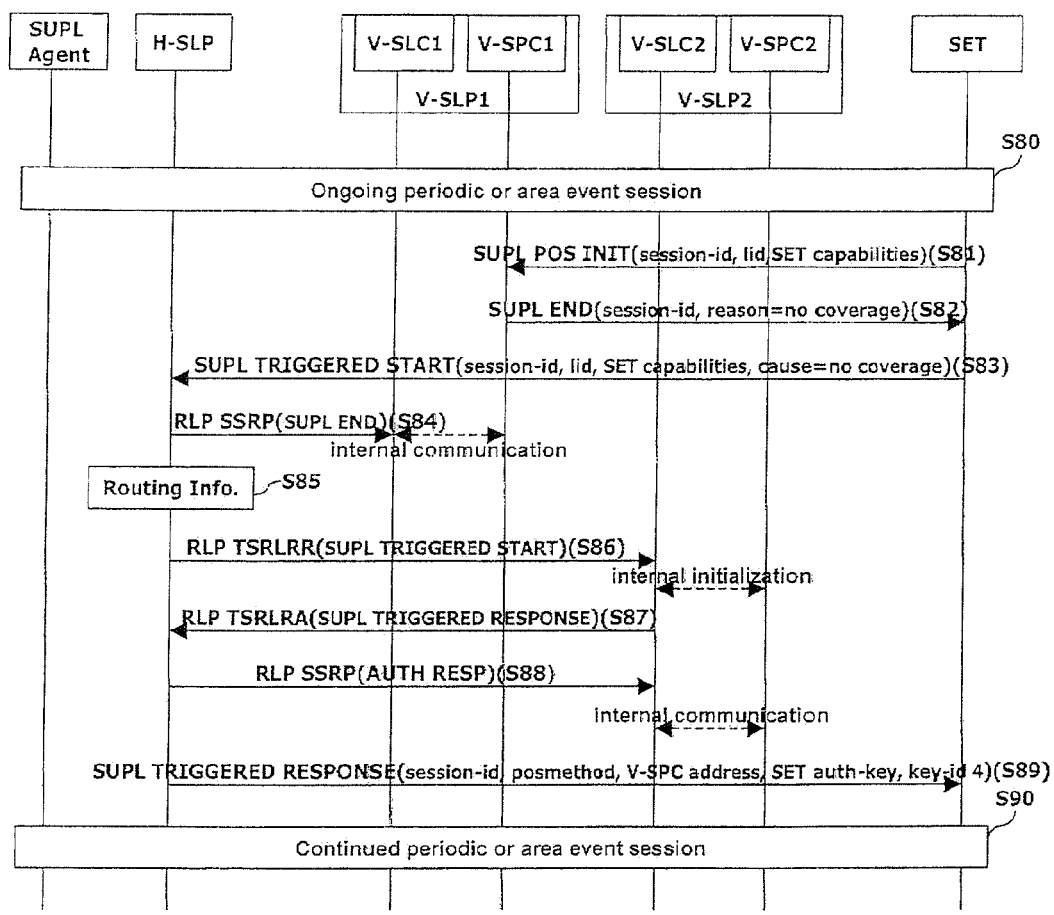
FIG. 4 illustrates a Network initiated Non-Proxy mode, as a third embodiment of the location positioning method in handover between networks according to the present invention.

FIG. 4 illustrates a Network initiated Non-Proxy mode, as a third embodiment of the location positioning method in handover between networks according to the present invention.

As shown in FIG. 4, while a trigger session such as a periodic or an area event session is ongoing, SET transmits a SUPL POS INIT message to start a positioning session with a V-SPC1 of V-SLP1 (S80). In case area-id (e.g. cell-id) is used to detect an area event, SET transmits the SUPL POS INIT message to V-SPC1 when an MNC or an SID is changed (S81).

Upon receiving the SUPL POS INIT message, V-SPC1 compares lid included in the SUPL POS INIT message with coverage area of V-SPC1 itself, and checks whether SET is within its coverage area. If the checked result shows that SET is within its coverage area, V-SPC1 proceeds to the step (S90), which will be explained later, and then continues to perform the periodic or the area event session. If not, V-SPC 1 transmits a SUPL END message including the checked result (no coverage) to SET (S82).

SET having received the SUPL END message acknowledges a handover occurrence between V-SLPs on the basis of the reason included in the SUPL END message, and transmits the SUPL TRIGGERED START message to H-SLP to request a new trigger parameter (S83). Preferably, the SUPL TRIGGERED START message contains at least session-id, SET capabilities, lid, cause for re-sending the SUPL TRIGGERED START (cause=no coverage), and the like. In addition, the SET capabilities include the supported positioning methods (e.g. SET-Assisted A-GPS, SET-Based A-GPS) and associated positioning protocols (e.g. RRLP, RRC, TIA-801), and so on.

H-SLP informs V-SLP1 about the end of the trigger session by transmitting the SUPL END message to V-SLC1 of V-SLP1 through the RLP message (S84), and V-SPC1 is informed of this through internal communication.

Further, H-SLP acknowledges that SET is currently SUPL roaming and is outside of the coverage area of V-SLP1 based on routing information, and then determines a V-SLP2 based on the lid included in the received SUPL TRIGGERED START message (S85).

Once V-SLP2 is determined, H-SLP transmits the SUPL TRIGGERED START message to V-SLC2 of V-SLP2 through the RLP message to inform that SET will start a SUPL positioning procedure (S86). The SUPL TRIGGERED START message is forwarded to V-SPC2 through an internal initialization.

V-SLC2 informs that it is ready to initiate a SUPL positioning procedure, by transmitting the SUPL TRIGGERED RESPONSE message to H-SLP (S87). Herein, V-SLC2 examines the received area event, recognizes cell-ids of the network indicating the target area, and then forwards the SUPL TRIGGERED RESPONSE message including the recognized cell-ids to H-SLP through the RLP.

H-SLP generates a key to be used for mutual V-SPC/SET authentication, and transmits the generated key to V-SLC2 through an AUTH RESP message using an RLP SSRP tunnel (S88). V-SLC2 forwards the corresponding key to V-SPC2 through internal communication. Further, H-SLP transmits the SUPL TRIGGERED RESPONSE message to SET (S89). The SUPL TRIGGERED RESPONSE message contains session-id, posmethod, V-SPC address, SET auth-key, key-id 4 and trigger parameter. Preferably, the trigger parameter, as shown in FIG. 1, includes target area, event type, cell-id of the target area, and positioning period.

Therefore, SET and V-SPC2 continue to perform the periodic event session or the same area event as the steps (S26~S42) in FIG. 1 by using information included in the SUPL TRIGGERED RESPONSE message (S90).

As described above, in the present invention, a triggered location service based upon an area event is provided in case a registered network is changed in a SUPL-based location information system, thereby enhancing user's convenience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of exchanging messages for a location service, comprising:
    transmitting, by a mobile terminal, a secure user plane location (SUPL) position initiation message to a home-SUPL location platform (H-SLP);
    receiving, by the mobile terminal, a SUPL end message from the H-SLP, the SUPL end message including a parameter indicating that the mobile terminal is outside of a coverage of a visited-SUPL location platform (V-SLP);
    transmitting, by the mobile terminal, a SUPL triggered start message to the H-SLP, the SUPL triggered start message including a cause for re-sending the SUPL triggered start message; and
    receiving, by the mobile terminal, a SUPL triggered response message from the H-SLP, the SUPL triggered response message including at least one trigger parameter.

2. The method of claim 1, further comprising:
    triggering a session using the received at least one trigger parameter.

3. The method of claim 2, wherein the triggered session is a periodic session.

4. The method of claim 2, wherein the triggered session is an area event session.

5. The method of claim 1, wherein the SUPL position initiation message includes a session identifier and a location identifier.

6. The method of claim 1, wherein the SUPL triggered start message further includes a session identifier, a location identifier, and capability information of the mobile terminal.

7. The method of claim 1, wherein the at least one trigger parameter includes area ids of a specific area.

8. A method of exchanging messages for a location service, comprising:
    receiving, by a home-SUPL location platform (H-SLP), a secure user plane location (SUPL) position initiation message from a mobile terminal;
    transmitting, by the H-SLP, a SUPL end message to the mobile terminal, the SUPL end message including a parameter indicating that the mobile terminal is outside of a coverage of a first visited-SUPL location platform (V-SLP);
    receiving, by the H-SLP, a SUPL triggered start message to the mobile terminal, the SUPL triggered start message including a cause for re-sending the SUPL triggered start message; and transmitting, by the H-SLP, a SUPL triggered response message to the mobile terminal, the SUPL triggered response message including at least one trigger parameter.

9. The method of claim 8, further comprising:
forwarding the SUPL position initiation message to the first V-SLP.

10. The method of claim 9, further comprising:
receiving a standard SUPL roaming position (SSRP) message including the SUPL end message from the first V-SLP.

11. The method of claim 10, wherein the SUPL triggered start message further includes a session identifier, a location identifier, and capability information of the mobile terminal.

12. The method of claim 11, further comprising:
identifying a second V-SLP based on the location identifier included in the SUPL triggered start message; and
communicating with the second V-SLP.

13. The method of claim 8, wherein the at least one trigger parameter triggered is for a periodic session.

14. The method of claim 8, wherein the at least one trigger parameter triggered is for an area event session.

15. The method of claim 8, wherein the SUPL position initiation request message includes a session identifier and a location identifier.

16. The method of claim 8, wherein the at least one trigger parameter includes area ids of a specific area.

* * * * *